United States Patent [19]
Pettersson et al.

[11] Patent Number: 4,896,031
[45] Date of Patent: Jan. 23, 1990

[54] PROXIMITY FUSE OPTICAL RADIATION RECEIVER HAVING WEDGE-SHAPED DAMPING FILTER POSITIONED ADJACENT PHOTOCELL

[75] Inventors: Erland Pettersson, Göteborg; Bengt Witt, Karlskoga; Ola Knutz, Leksand, all of Sweden

[73] Assignee: Aktiebolag Bofors, Bofors, Sweden

[21] Appl. No.: 205,255

[22] Filed: Jun. 10, 1988

[51] Int. Cl.$^4$ ............................................. G01J 1/20
[52] U.S. Cl. ................................... 250/203 R; 356/1
[58] Field of Search ............... 250/203 R, 561, 203 S, 250/201 AF; 356/1, 4, 141, 152

[56] References Cited

U.S. PATENT DOCUMENTS

| | | | |
|---|---|---|---|
| 3,144,562 | 8/1964 | Orthuber et al. | 250/203 R |
| 3,296,443 | 1/1967 | Argyle | 250/203 R |
| 3,936,187 | 2/1976 | Momose | 356/1 |
| 4,227,813 | 10/1980 | Pirlet | 356/1 |
| 4,289,397 | 9/1981 | Itzkan et al. | 356/5 |
| 4,673,817 | 6/1987 | Oomen | 356/4 |

*Primary Examiner*—David C. Nelms
*Assistant Examiner*—William L. Oen
*Attorney, Agent, or Firm*—Pollock, Vande Sande & Priddy

[57] ABSTRACT

A receiver for receiving optical radiation includes detectors which, on reception, emit an electric signal. The detectors are operative to emit an electric signal of a level which is substantially independent of the angle of incidence of the optical radiation on the receiver.

24 Claims, 1 Drawing Sheet

4,896,031

PROXIMITY FUSE OPTICAL RADIATION RECEIVER HAVING WEDGE-SHAPED DAMPING FILTER POSITIONED ADJACENT PHOTOCELL

TECHNICAL FIELD

The present invention relates to a receiver for receiving optical radiation and comprising detector means which, on receipt of such radiation, emit an electric signal.

BACKGROUND ART

Various types and arrangements of units are previously known in this art in conjunction with optical range finders which are included in, for example, proximity fuses for missiles, projectiles and other launchable units.

One such optical range finder operates with transmitter and receiver units included in the unit in question. The optical radiation departing from the transmitter is to be reflected on a target located in the transmission direction and back towards the receiver. Depending upon the distance of the target from the unit, the reflected radiation will impinge upon the receiver at different angles of incidence.

The transmitter must be provided with a power which permits reflection and purposeful reception of the received signal when the target is located at maximum range for which detection is possible.

This implies, inter alia, that, on target reflection on targets which are closer than the maximum range, there will be obtained an over-dimensioned incoming signal from the detector device. This entails problems not least because of the so-called return dispersion.

OBJECT OF THE PRESENT INVENTION

The present invention has for its object to provide an apparatus which solves the above and other problems and takes as its point of departure the concept that damping of the incoming signal is to take place, such that the signal will be dependent upon the angle of incidence. In this case, the arrangement of transmitter, receiver and target is such that a most distal target will impinge upon the detector device with the largest angle of incidence ($\approx 90°$), while a target at the shortest possible range will give the lowest angle of incidence (e.g. $\approx 0°-10°$).

In more concrete terms, that which may be considered as novel for the apparatus according to the present invention is that the above-mentioned detector device is operative, within a distance of the range of the receiver, to emit an electric signal of a level which is substantially independent of the angle of incidence of the optical radiation on the receiver.

In one preferred embodiment, use is preferably made of a radiation damping filter which is cuneiform (wedge-shaped) in its vertical section and is disposed in conjunction with the surface of the detector device such that the signal level substantially independent of the angle of incidence of the optical radiation will be realized by conveying the optical radiation to different parts of the surface of the detctor device. As a result of the cuneiform configuration of the filter, different amounts of radiation will reach the above-mentioned different surface areas.

In one alternative embodiment, the optical radiation received within the total angle of incidence sector passes through a collimator lens, the surface of the detector device being, in addition, obliquely inclined such that the focal point will fall in, beneath and/or above the surface of the detector in response to the angle of incidence.

In yet a further embodiment, a gap, a mirror (preferably a diffuse mirror), and a lens are disposed at the surface of the detector device such that the impinging radiation is led along different paths for attaining the contemplated purpose. Thus, the surface of the detector device is directly exposable to optical radiation which impinges against the surface within a first angle of incidence sector. Optical radiation which impinges on the surface via within a second angle of incidence sector is reflected on the mirror disposed at the surface before reaching the detector surface. Optical radiation impinging within a third angle of incidence sector is led to the surface above-mentioned collimator lens and the above-mentioned mirror, and optical radiation which impinges within a fourth angle of incidence sector is led towards the surface via a collimator lens, and so on.

Employing the above-proposed arrangement, it is possible in a simple manner to realize a detector signal which will be substantially independent of the range and angle to the target. The term substantially is here taken to mean variations which may be considered to be slight in this context.

BRIEF DESCRIPTION OF THE ACCOMPANYING DRAWINGS

A currently proposed embodiment of an apparatus displaying the significative characterizing features of the present invention will be described in greater detail below with reference to the accompanying drawing.

DESCRIPTION OF PREFERRED EMBODIMENT

Figure 1:
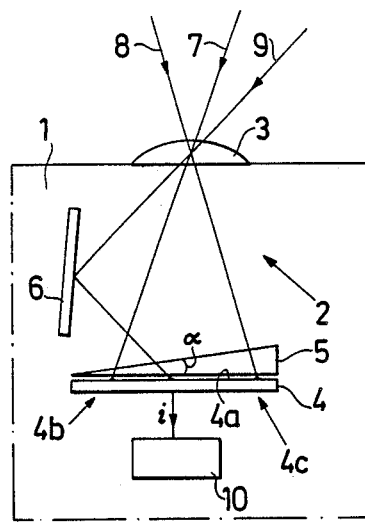
FIG. 1 shows, in schematic form, the range-dependent damping by means of a cuneiform radiation damping filter disposed in conjunction with the receiver surface of the detector device.

Referring to the drawings, a missile (unit) is symbolically intimated by reference numeral 1 in FIG. 1. The missile is fitted with a receiver unit 2 for optical radiation. The receiver unit includes a lens 3 and a photodetector 4 of per se known type. In conjunction with the upper side of the photodetector, there is disposed a damper 5 which is cuneiform in its vertical section and is similarly of per se known type. The receiver also includes a mirror 6, for example a diffuse mirror.

In FIG. 1, three different major directions for incoming optical radiation are indicated by reference numerals 7, 8 and 9. The optical radiation may consist of optical radiation pulses which are emitted, for instance, in lobe form. The receiver 2 may cooperate with identically constructed receivers which together sense the entire circumference of the unit 1. Since the function of all receivers is identical, only the function of the receiver illustrated in FIG. 1 will be described.

The optical radiation which impinges in the direction 7 is focused on a first portion 4b of the surface of the photodetector. The cuneiform damper 5 damps the radiation relatively slightly on this part of the surface. The optical radiation which impinges from the direction 8 is focused on a second portion 4c of the detector surface. On this second portion of the detector surface, the damper 5 damps the radiation relatively greatly. The first radiation direction 7 may, therefore, represent a target at a greater range than a target which reflects the radiation according to the impingement direction 8. It will readily be perceived that the angle α of the cuneiform damper is to be selected such that the above-mentioned distance for range independence will occur within the range sector in which the receiver 2 is to operate.

The photodetector is connected to a signal processing unit 10 which, in accordance with the above, will receive a signal i whose level is substantially range-independent.

By means of the mirror 6, the detector surface 4a will, in principle, be extended. The mirror 6 ensures that optical radiation which impinges from the third major direction 9 is reflected on a suitable point on the detector surface. The mirror 6 may consist of a diffuse mirror, which entails that further damping will be obtained in the mirror of the optical radiation in question.

Figure 2:
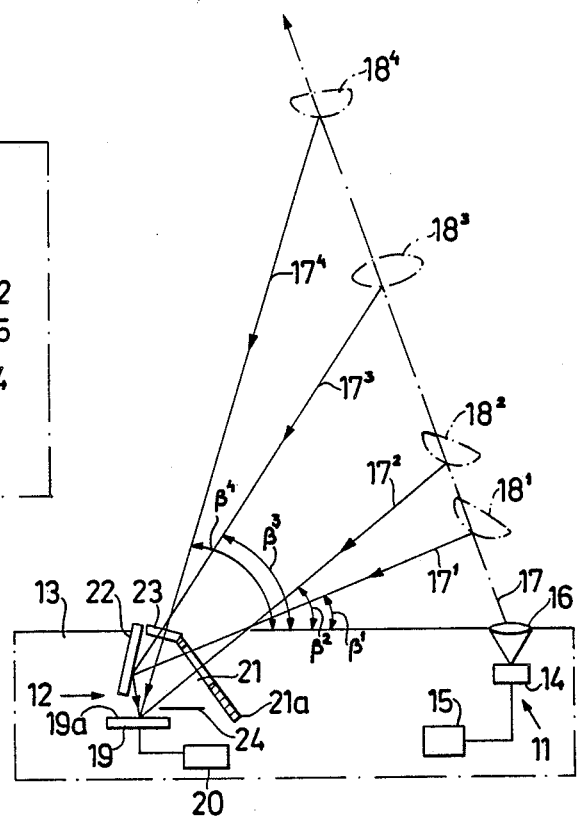
FIG. 2 shows, in principle, a transmitter and receiver arrangement in a launchable unit, for example in the form of a missile, which assumes a predetermined position or trajectory to a number of contemplated targets.

In FIG. 2, both transmitter and receiver have been designated 11 and 12, respectively. These transmitters and receivers are disposed in a per se known manner in the actual unit 13. The transmitter is provided with a laser or LED 14 which is driven by drive unit 15. The optical radiation emitted, for instance in pulsed lobe form, in the transmitter, departs via lens devices 16 and the major direction of the radiation has been indicated by reference numeral 17. The unit 13 may be provided with a number of such transmitters which, together, are full-circle operative seen from the circumference of the unit 13. The emitted signal is to be reflected on a target which is located in the emission direction. For different positions of the target which is located in the emission direction 17 of the transmitter have been indicated by reference numerals $18^1$, $18^2$, $18^3$ and $18^4$. In dependence upon the distance of the target from the unit, the radiation 17 will be reflected towards the receiver 12 at different angles of as seen from the receiver. The reflected signals occasioned by the above-mentioned target positions have been indicated by reference numerals $17^1$, $17^2$, $17^3$ and $17^4$, and the angles by $\beta^1$, $\beta^2$, $\beta^3$ and $\beta^4$.

The photodetector of the receiver has been designated 19 and the signal processing circuit following the detector has been designated 20. The receiver is provided with a gap 21, with a diffuse mirror 22 and a collimator lens 23. The device 21a displaying the gap 21 is obliquely inclined in relation to the detector surface 19a. The mirror 22 is also obliquely inclined in relation to the above-mentioned detector surface. The lens is disposed substantially at right angles to the reflecting surface of the mirror 22. Furthermore, the device 21a and the mirror 22 are arranged such that the imaginary extensions of these parts will make an acute angle in the plane of the drawing according to FIG. 2.

The different major directions $17^1$, $17^2$, $17^3$, $17^4$ of the optical radiation each symbolize their incidence angle sector which is processed individually in the receiver. This latter is provided with a device 24 which is operative to give a sharp edge of the reproduced target on the surface of the photodetector. The radiation from the target in position $18^1$ which is most proximal the unit 13 must be subjected to the extremest damping in relative terms. The radiation $17^1$ is, therefore, led in towards the diffuse mirror 22 before being reflected to the detector surface 19a. The radiation $17^2$ is led in via the gap 21 direct onto the detector surface. The radiation from $18^3$ is led in via the lens device 23 and the diffuse mirror 22 before impinging on the detector surface 19a. Finally, the radiation $17^4$ from the target position $18^4$ is led in through the lens device 23 and directly down onto the detector surface 19a. There will hereby be obtained a damping of the impinging optical radiation which varies depending upon the distance between target and unit.

Figure 3:
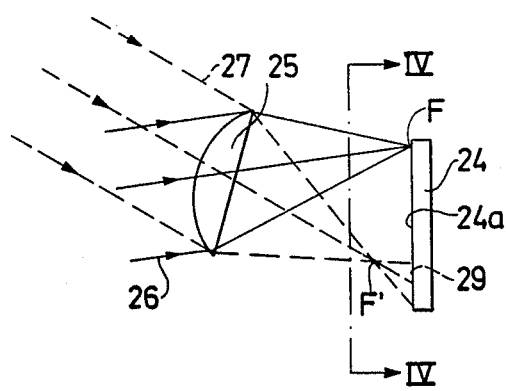
FIG. 3 shows, in principle, an arrangement with detector and lens.
Figure 4:
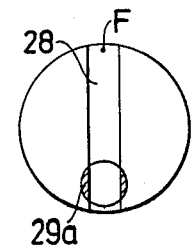
FIG. 4 is a horizontal view showing a gap suitable for use with the lens and detector according to FIG. 3.

The variation of received optical radiation described in the foregoing may also be obtained using the embodiment according to FIGS. 3 and 4. In this instance, the detector device 24 is obliquely inclined in relation to the lens device 25 such that the focal point F will fall direct on the surface 24a for optical radiation with a first major direction 26, and the focal point F' will fall above the detector surface 24a for an optical radiation with a major direction 27. The mutual oblique inclination between detector and lens may also be arranged such that the focal point F' falls beyond the detector surface 24a.

A gap 28 according to FIG. 4 may be utilized together with the lens and the detector of FIG. 3. The gap 28 cuts off a portion of the optical radiation 29 which impinges from the direction 27. The intercepted portions are designated 29a in FIG. 4.

The present invention should not be considered as restricted to that described above and shown on the drawing, many modifications being conceivable without departing from the spirit and scope of the appended claims.

What we claim and desire to secure by Letters Patent is:

1. In a proximity fuse for a launchable unit, an apparatus including a transmitter which transmits optical radiation reflectable against a target surface and a receiver provided with a detector device for generating an electric signal on receipt of the radiation reflected from the target surface and impinging upon the receiver/detector at different angles of incidence depending upon the distance of the target surface from the unit, wherein the receiver comprises:

a fixed mechanical/optical arrangement including a radiation damping filter, collimator lens, mirror and gap for distributing the received radiation to the surface of the detector device to render the sensitivity of the apparatus to depend upon angles of incidence in such a manner that the electric signal emitted by the detector device will be substantially independent of said distance within the entire scanning region of the proximity fuse.

2. The apparatus as claimed in claim 1, wherein a radiation damping filter is cuneiform in its vertical section and is disposed above the surface of the detector device, such that the value of the electric signal substantially independent of the angles of incidence will be realized by conveyance of the optical radiation to different parts of the surface of the detector device.

3. The apparatus as claimed in claim 1 wherein the optical radiation received within the total incidence angle sector passes the collimator lens; and wherein the surface of the detector device is obliquely inclined such that the focal point of the optical radiation will fall in, under or above the surface of the detector in response to the angle of incidence of the optical radiation.

4. The apparatus as claimed in claim 1 wherein the surface of the detector device receives the optical radiation after the same is reflected from a mirror, the optical radiation disposing at the surface of the detector device in a first incidence angle sector.

5. The apparatus as claimed in claim 1, wherein the surface of the detector device is directly exposable, via a gap, to optical radiation which impinges on the surface within a second incidence angle sector.

6. The apparatus as claimed in claim 5, wherein the mirror comprises a diffuse mirror.

7. The apparatus as claimed in claim 1, wherein the surface of the detector device receives the optical radiation through the collimator lens and reflection from a diffuse mirror in a third incidence angle sector.

8. The apparatus as claimed in claim 1, wherein the surface of the detector device receives the optical radiation through the collimator lens in a fourth incidence angle sector.

9. The apparatus as claimed in claim 1, wherein the surface of the detector device is placed substantially parallel along a longitudinal axis of the unit which is provided with the receiver, a diffuse mirror being obliquely inclined above the surface of the detector device, the collimator lens being disposed substantially at right angles in relation to the mirror and at the upper edge thereof, and the gap being obliquely inclined in relation to the detector surface such that imaginary extensions of the gap and the mirror effect an acute angle.

10. The apparatus as claimed in claim 2 wherein the optical radiation received within the total incidence angle sector passes the collimator lens; and
   wherein the surface of the detector device is obliquely inclined such that the focal point of the optical radiation will fall in, under or above the surface of the detector in response to the angle of the incidence of the optical radiation.

11. The apparatus as claimed in claim 2 wherein the surface of the detector device receives the optical radiation after the same is reflected from a mirror, the optical radiation disposing at the surface of the detector device in a first incidence angle sector.

12. The apparatus as claimed in claim 2, wherein the surface of the detector device is directly exposable, via a gap, to optical radiation which impinges on the surface within a second incidence angle sector.

13. The apparatus as claimed in claim 4, wherein the surface of the detector device is directly exposable, via a gap, to optical radiation which impinges on the surface within a second incidence angle sector.

14. The apparatus as claimed in claim 2, wherein the surface of the detector device receives the optical radiation through the collimator lens and reflection from diffuse mirror in a third incidence angle sector.

15. The apparatus as claimed in claim 3, wherein the surface of the detector device receives the optical radiation through the collimator lens and reflection from a diffuse mirror in a third incidence angle sector.

16. The apparatus as claimed in claim 4, wherein the surface of the detector device receives the optical radiation through the collimator lens and reflection from a diffuse mirror in a third incidence angle sector.

17. The apparatus as claimed in claim 5, wherein the surface of the detector device receives the optical radiation through the collimator lens and reflection from a diffuse mirror in a third incidence angle sector.

18. The apparatus as claimed in claim 6, wherein the surface of the detector device receives the optical radiation through a the collimator lens and reflection from the diffuse mirror in a third incidence angle sector.

19. The apparatus as claimed in claim 2, wherein the surface of the detector device receives the optical radiation through the collimator lens in a fourth incidence angle sector.

20. The apparatus as claimed in claim 3, wherein the surface of the detector device receives the optical radiation through the collimator lens in a fourth incidence angle sector.

21. The apparatus as claimed in claim 4, wherein the surface of the detector device receives the optical radiation through the collimator lens in a fourth incidence angle sector.

22. The apparatus as claimed in claim 5, wherein the surface of the detector device receives the optical radiation through the collimator lens in a fourth incidence angle sector.

23. The apparatus as claimed in claim 6, wherein the surface of the detector device receives the optical radiation through the collimator lens in a fourth incidence angle sector.

24. The apparatus as claimed in claim 7, wherein the surface of the detector device receives the opticl radiation through the collimator lens in a fourth incidence angle sector.

* * * * *